US009923205B2

(12) United States Patent
Korchev et al.

(10) Patent No.: US 9,923,205 B2
(45) Date of Patent: Mar. 20, 2018

(54) OXIDIZED CARBON BLACKS AND APPLICATIONS FOR LEAD ACID BATTERIES

(71) Applicant: Cabot Corporation, Boston, MA (US)

(72) Inventors: Andriy Korchev, Westford, MA (US); Aurelien DuPasquier, Westford, MA (US); Paolina Atanassova, Waltham, MA (US)

(73) Assignee: Cabot Corporation, Boston, MA (US)

( * ) Notice: Subject to any disclaimer, the term of this patent is extended or adjusted under 35 U.S.C. 154(b) by 137 days.

(21) Appl. No.: 15/211,406

(22) Filed: Jul. 15, 2016

(65) Prior Publication Data

US 2016/0322634 A1 Nov. 3, 2016

Related U.S. Application Data

(60) Provisional application No. 62/193,844, filed on Jul. 17, 2015, provisional application No. 62/221,824, filed on Sep. 22, 2015.

(51) Int. Cl.
*H01M 4/14* (2006.01)
*H01M 4/583* (2010.01)
*H01M 10/06* (2006.01)
*C09C 1/56* (2006.01)

(52) U.S. Cl.
CPC ............. *H01M 4/583* (2013.01); *C09C 1/565* (2013.01); *H01M 4/14* (2013.01); *H01M 10/06* (2013.01); *C01P 2006/12* (2013.01); *C01P 2006/19* (2013.01); *C01P 2006/40* (2013.01)

(58) Field of Classification Search
CPC ........ H01M 4/14; H01M 4/583; H01M 10/06; C01P 2006/12; C01P 2006/19; C01P 2006/40; C09C 1/565
See application file for complete search history.

(56) References Cited

FOREIGN PATENT DOCUMENTS

WO WO 2013/148242 A1 10/2013

OTHER PUBLICATIONS

Boehm, H.P., "Some Aspects of the Surface Chemistry of Carbon Blacks and Other Carbons", Carbon, vol. 32, No. 5, pp. 759-769, 1994.
Celzard, A., et al., "Electrical Conductivity of Carbonaceous Powders", Carbon 40 (2002), pp. 2801-2815.
Goertzen, S.L., et al., "Standardization of the Boehm Titration. Part I. $CO_2$ Expulsion and Endpoibnt Determination", Carbon 48 (2010), pp. 1252-1261.
Oickle, A.M., "Standardization of the Boehm Triration: Part II. Method of Agitation, Effect of Filtering and Dilute Titrant", Carbon 48 (2010), pp. 3313-3322.
Gruber, T., et al., "Raman Studies of Heat-Treated Carbon Blacks", Carbon, vol. 32, No. 7, pp. 1377-1382, 1994.
Sanchez-Gonzalez, J., et al., "Electrical Conductivity of Carbon Blacks Under Compression", Carbon 43 (2005), pp. 741-747.

(Continued)

Primary Examiner — Brittany Raymond

(57) ABSTRACT

Disclosed herein are oxidized carbon blacks, which can be incorporated into electrode compositions for lead acid batteries. In some embodiments, the oxidized carbon blacks have a BET surface area ranging from 650 to 2100 m²/g; an oil absorption number (OAN) ranging from 35 to 500 mL/100 g; and a volatile content of at least 5.5 wt. % relative to the total weight of the oxidized carbon black, as determined by weight loss at 950° C.

20 Claims, 6 Drawing Sheets

(56) References Cited

OTHER PUBLICATIONS

Boehm, H.P., "Surface Oxides of Carbon", Angew. Chem., vol. 3, No. 10, 1964, pp. 669-677.
International Search Report and the Written Opinion of the International Searching Authority, or the Declaration of PCT/US2016/042500, dated Oct. 14, 2016.

US 9,923,205 B2

OXIDIZED CARBON BLACKS AND APPLICATIONS FOR LEAD ACID BATTERIES

RELATED APPLICATION

This application claims priority under 35 U.S.C. § 119(e) to U.S. Prov. App. No. 62/193,844, filed Jul. 17, 2015, and 61/221,824, filed Sep. 22, 2015, hereby incorporated by reference.

FIELD OF THE INVENTION

Disclosed herein are oxidized carbon blacks, which can be useful in electrode and lead acid battery applications.

BACKGROUND

There has been increasing use in the addition of carbonaceous materials to lead acid battery compositions (e.g., anode compositions). It is has been discovered that the carbon can improve charge acceptance and cycle life. However, the presence of carbon can result in increased water loss during high temperature overcharge conditions relevant for automotive applications and stationary applications under overcharge voltage. Accordingly, there is a continuing need to develop new additives for lead acid batteries that achieve suitable charge acceptance and cycle life while preventing increased water loss.

SUMMARY

One embodiment provides an oxidized carbon black having the following properties:
 a BET surface area ranging from 650 to 2100 $m^2/g$;
 an oil absorption number (OAN) ranging from 35 to 500 mL/100 g; and
 a volatile content of at least 5.5 wt. % relative to the total weight of the oxidized carbon black, as determined by weight loss at 950° C.

Another embodiment provides an oxidized carbon black having the following properties:
 a BET surface area ranging from 650 to 2100 $m^2/g$;
 an oil absorption number (OAN) ranging from 35 to 500 mL/100 g; and
 a total oxygen content of at least 3.5 wt. % relative to the total weight of the oxidized carbon black.

Another embodiment provides an oxidized carbon black having the following properties:
 a BET surface area ranging from 650 to 2100 $m^2/g$;
 an oil absorption number (OAN) ranging from 35 to 500 mL/100 g; and
 a total titratable acidic group content of at least 0.5 $\mu mol/m^2$, as determined by Boehm's titration method.

Another embodiment provides an oxidized carbon black having the following properties:
 a BET surface area ranging from 650 to 2100 $m^2/g$; and
 an oil absorption number (OAN) ranging from 35 to 500 mL/100 g,
 a total titratable acidic group content of at least 0.5 mmol/g, as determined by Boehm's titration method.

Another embodiment provides an oxidized carbon black derived from a base carbon black, wherein the base carbon black has the following properties:
 a BET surface area ranging from 650 to 2100 $m^2/g$; and
 an oil absorption number (OAN) ranging from 35 to 500 mL/100 g,
 wherein the oxidized carbon black has a volatile content of at least 5.5 wt. % relative to the total weight of the oxidized carbon black, as determined by weight loss at 950° C.

Another embodiment provides an oxidized carbon black derived from a base carbon black, wherein the base carbon black has the following properties:
 a BET surface area ranging from 650 to 2100 $m^2/g$; and
 an oil absorption number (OAN) ranging from 35 to 500 mL/100 g,
 wherein the oxidized carbon black has a total oxygen content of at least 3.5 wt. % relative to the total weight of the oxidized carbon black.

Another embodiment provides an oxidized carbon black derived from a base carbon black, wherein the base carbon black has the following properties:
 a BET surface area ranging from 650 to 2100 $m^2/g$; and
 an oil absorption number (OAN) ranging from 35 to 500 mL/100 g,
 wherein the oxidized carbon black has a total titratable acidic group content of at least 0.5 $\mu mol/m^2$, as determined by Boehm's titration method.

Another embodiment provides an oxidized carbon black derived from a base carbon black, wherein the base carbon black has the following properties:
 a BET surface area ranging from 650 to 2100 $m^2/g$; and
 an oil absorption number (OAN) ranging from 35 to 500 mL/100 g,
 wherein the oxidized carbon black has a total titratable acidic group content of at least 0.5 mmol/g, as determined by Boehm's titration method.

Another embodiment provides an electrode composition comprising:
 the oxidized carbon black as disclosed herein; and
 at least one lead-containing material.

Another embodiment provides an electrode composition comprising:
 an oxidized carbon black having a BET surface area ranging from 80 to 2100 $m^2/g$, wherein the oxidized carbon black has a volatile content of at least 3 wt. % relative to the total weight of the oxidized carbon black, as determined by weight loss at 950° C.; and
 at least one lead-containing material.

Another embodiment provides an electrode composition comprising:
 an oxidized carbon black having a BET surface area ranging from 80 to 2100 $m^2/g$, wherein the oxidized carbon black has a total oxygen content of at least 3.5 wt. % relative to the total weight of the oxidized carbon black; and
 at least one lead-containing material.

Another embodiment provides an electrode composition comprising:
 an oxidized carbon black having a BET surface area ranging from 80 to 2100 $m^2/g$, wherein the oxidized carbon black has a total titratable acidic group content of at least 0.5 $\mu mol/m^2$, as determined by Boehm's titration method; and
 at least one lead-containing material.

Another embodiment provides an electrode composition comprising:
 an oxidized carbon black having a BET surface area ranging from 80 to 2100 $m^2/g$, wherein the oxidized carbon black has a total titratable acidic group content of at least 0.5 mmol/g, as determined by Boehm's titration method; and
 at least one lead-containing material.

Another embodiment provides electrodes comprising the oxidized carbon blacks or electrode compositions disclosed herein. Another embodiment provides a cell or lead acid battery comprising the electrodes disclosed herein.

Another embodiment provides a method of making an oxidized carbon black, comprising:

oxidizing a base carbon black, in which the base carbon black has a BET surface area ranging from 650 to 2100 m$^2$/g and an oil absorption number (OAN) ranging from 35 to 500 mL/100 g;

wherein the oxidized carbon black has at least one of the following properties:

(a) a volatile content of at least 5.5 wt. % relative to the total weight of the oxidized carbon black, as determined by weight loss at 950° C.;

(b) a total oxygen content of at least 3.5 wt. % relative to the total weight of the oxidized carbon black;

(c) a total titratable acidic group content of at least 0.5 μmol/m$^2$, as determined by Boehm's titration method; and (d) a total titratable acidic group content of at least 0.5 mmol/g, as determined by Boehm's titration method.

BRIEF DESCRIPTION OF THE DRAWING(S)

Figure 5:
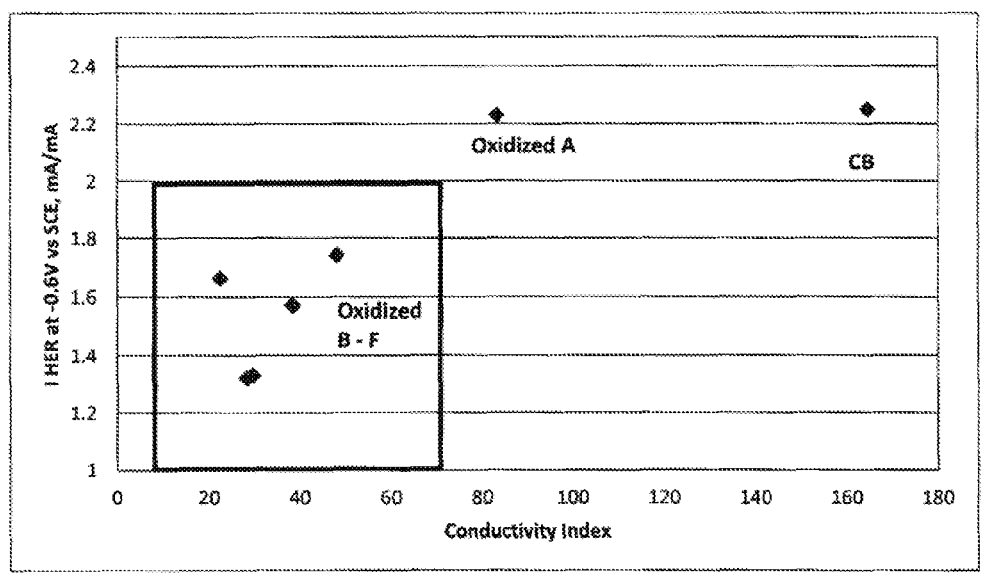
Figure 6:
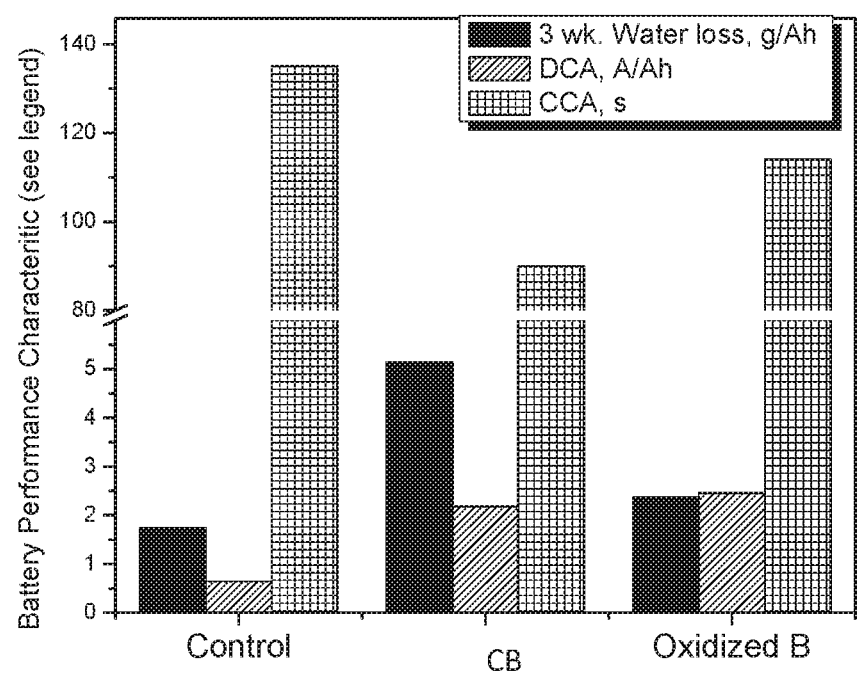

FIG. 5 is a plot of normalized hydrogen evolution reaction current (I HER) in mA/mA at −0.6V (vs. SCE), versus conductivity index from Example 5; and FIG. 6 is a bar chart of dynamic charge acceptance (DCA), cold crank (CCA) and 3 wk. water loss results of Example 6 for lead acid batteries without carbon black (control), with 0.5 wt. % carbon black (CB) and 0.5 wt. % oxidized carbon black (sample "Oxidized B").

DETAILED DESCRIPTION

It has been discovered that certain oxidized carbon blacks provide a high dynamic charge acceptance while reducing the water loss seen upon adding other carbon additives. Accordingly, disclosed herein are oxidized carbonaceous materials, which can be incorporated into electrodes for lead acid battery applications.

In general, the addition of carbon to a negative electrode plate can improve charge acceptance and cycle life of the lead acid battery. Charge acceptance and cycle life of lead acid batteries are limited by formation of large crystals of lead sulfate, which have a more thermodynamically favorable surface to volume ratio. As the surface to volume ratio of the formed lead sulfate crystals declines, the ability of the negative electrode to reverse the reduction of PbSO$_4$ back to lead is impaired, especially on the short time scales typically associated with rapid charge, and consequently the charge acceptance deteriorates. Formation of large lead sulfate crystals thus results in kinetic irreversibility in charge and discharge rates, a condition known as "sulfation." Excessive accumulation of kinetically irreversible lead sulfate crystals in turn results in deterioration of the negative plate/electrode structure, which can lead to premature failure and loss of cycle life.

The addition of a carbonaceous material (e.g. carbon black, graphite, activated carbon, or other forms of carbon such as graphenes or carbon nanotubes) can result in modification of the negative electrode morphology to improve kinetic reversibility in formation and dissolution of formed lead sulfate crystals and preserved electrode stability during multiple cycles of charge and discharge, and thereby can improve charge acceptance and cycle life. However, modified negative electrode morphology may result in elevated rate of water electrolysis and overall increased rate of water loss, especially in overcharge conditions. In one embodiment, this trade-off is mitigated to improve the benefit of carbon additives in improvement of charge acceptance and cycle life, e.g., by reducing water loss.

As disclosed herein, it was discovered that high DCA and reduced water loss can be achieved with oxidized carbon blacks having certain morphologies.

Accordingly, one embodiment provides an oxidized carbon black having the following properties:

a BET surface area ranging from 650 to 2100 m$^2$/g; and
an oil absorption number (OAN) ranging from 35 to 500 mL/100 g.

As used herein, "oxidized carbon black" refers to carbon black having an appreciable number of oxygen atoms. The presence of oxygen atoms can be determined by a number of methods known in the art, such as volatile matter tests, oxygen content by inert gas fusion, or a total titratable acidic group content as determined by Boehm's titration method, as described in greater detail herein.

In one embodiment, the oxidized carbon black has a minimum volatile content. Volatile content of oxidized carbon black relates to the loss of material weight upon exposure to 950° C. in the inert atmosphere and reported as wt. %.

In one embodiment, the oxidized carbon black has a volatile content of at least 5.5 wt. % relative to the total weight of the oxidized carbon black. In one embodiment, the volatile content is determined by a volatile matter test at 950° C. according to DIN 53552. In one embodiment, the volatile content is at least 6 wt. %, at least 8 wt. %, at least 10 wt. %, at least 12 wt. %, at least 15 wt. %, at least 20 wt. % relative to the total weight of the oxidized carbon black. In one embodiment, the volatile content ranges from 5.5 to 25 wt. %, e.g., from 8 to 25 wt. %, from 10 to 25 wt. %, from 12 to 25 wt. %, from 15 to 25 wt. %, from 20 to 25 wt. %, from 5.5 to 20 wt. %, from 8 to 20 wt. %, from 10 to 20 wt. %, from 12 to 20 wt. %, or from 15 to 20 wt. %, relative to the total weight of the oxidized carbon black.

In one embodiment, the oxidized carbon black has a minimum oxygen content, which can determined by any method known in the art. In one embodiment, the oxidized carbon black has a total oxygen content of at least 3.5 wt. % relative to the total weight of the oxidized carbon black, as determined by inert gas fusion. Total oxygen content by inert gas fusion can be determined by exposing an oxidized carbon sample to very high temperatures (e.g., about 3000° C.) under inert gas conditions. The oxygen in the sample reacts with carbon to form CO and CO$_2$, which can be monitored by non-dispersive infrared technique. The total oxygen content is reported in weight percent relative to the total weight of the oxidized carbon. Various oxygen analyzers based on the inert gas fusion methods are known in the art and commercially available, for example a LECO® TCH600 analyzer. In one embodiment, the total oxygen content is at least 3.7 wt. %, at least 4 wt. %, at least 4.2 wt. %, at least 4.3 wt. %, or at least 4.5 wt. % relative to the total weight of the oxidized carbon black. In one embodiment, the total oxygen content ranges from 3.5 to 20 wt. %, e.g., from 3.7 to 20 wt. %, from 4 to 20 wt. %, from 4.2 to 20 wt. %, from 4.3 to 20 wt. %, or from 4.5 to 20 wt. % relative to the total weight of the oxidized carbon black.

In one embodiment, the oxidized carbon black has a minimum total titratable acidic group content as determined by Boehm's titration method. The Boehm titration method is a known in the art to measure the concentration of various surface acidic groups on oxidized carbons (see Boehm, H. P., Angew. Chem. 10, 669, (1964); Boehm, H. P., Carbon 32, 759 (1994); Goertzen, S. L., Carbon, 48, 1252 (2010); and Oickle, A. M., Carbon, 48, 3313 (2010)). This method is based on acid-base titration of oxidized carbons with one or more bases, e.g., three bases of different strength: NaOH, $Na_2CO_3$, and $NaHCO_3$, with the assumption that NaOH neutralizes surface carboxylic, lactonic, and phenolic groups of oxidized carbon, $Na_2CO_3$ neutralizes surface carboxylic and lactonic groups, whereas $NaHCO_3$ neutralizes only surface carboxylic groups. In one embodiment, the total titratable acidic group content is the sum of the content of carboxylic groups, lactone groups, and phenol groups as determined by Boehm's titration method. In one embodiment, the total titratable acidic group content for oxidized carbon black results from titration with NaOH in accordance with Boehm's method.

In one embodiment, the total titratable acidic group content of oxidized carbon black by Boehm's titration method is determined on a surface area basis, where BET surface area of oxidized carbon black is used. In one embodiment, the total titratable acidic group content (e.g., sum of surface carboxylic, lactone and phenols groups) is at least 0.5 $\mu mol/m^2$ as determined by Boehm's titration method, e.g., at least 0.7 $\mu mol/m^2$, at least 1 $\mu mol/m^2$, at least 1.1 $\mu mol/m^2$, or at least 1.2 $\mu mol/m^2$. In another embodiment, the total titratable acidic group content by Boehm's titration method is determined on a weight basis, e.g., at least 0.5 mmol/g as determined by Boehm's titration method, e.g., at least 0.7 mmol/g, at least 1.1 mmol/g, at least 1.2 mmol/g, at least 1.3 mmol/g, at least 1.4 mmol/g, or at least 1.5 mmol/g.

In one embodiment, the oxidized carbon black has a concentration of surface carboxylic groups ranging from 0.15 mmol/g to 1.5 mmol/g, as determined by Boehm's titration method. In another embodiment, the oxidized carbon black has a concentration of surface carboxylic groups ranging from 0.1 $\mu mol/m^2$ to 1.2 $\mu mol/m^2$, as determined by Boehm's titration method.

Generally, oxidized blacks feature a surface having oxygen-containing groups such as one or more of phenols, lactones, carbonyls, carboxylic acids, anhydrides, ethers, and quinones. The extent of oxidation of carbon black can determine the surface concentration of such oxygen-containing groups. The carbon blacks disclosed herein can be oxidized by a variety of oxidizing agents known in the art. Exemplary oxidizing agents for carbon blacks include oxygen gas, ozone, nitrogen oxides ($N_xO_y$, where x=1-2 and y=1-4, e.g., NO, $NO_2$, including mixtures with air), persulfates such as sodium, potassium, and ammonium persulfate, hypohalites such as sodium hypochlorite, halites, halates, or perhalates (such as sodium chlorite, sodium chlorate, or sodium perchlorate), oxidizing acids such as nitric acid, and transition metal-containing oxidants such as permanganate salts, osmium tetroxide, chromium oxides, ceric ammonium nitrates, and mixtures thereof, e.g., mixtures of gaseous oxidants such as oxygen and ozone.

Oxidation of carbon black particles is known to increase the material volatile content and total oxygen content because of the formation of various surface carbon-oxygen groups. Most of these groups convert to CO and/or $CO_2$ upon exposure of the oxidized carbon black to elevated temperature (such as 950° C. or higher) in the inert atmosphere. Some of the formed surface carbon-oxygen containing groups of oxidized carbon black are ionizable.

In one embodiment, the oxidized carbon blacks have a BET surface area ranging from 650 $m^2/g$ to 2100 $m^2/g$, e.g., from 650 $m^2/g$ to 2000 $m^2/g$, from 650 $m^2/g$ to 1800 $m^2/g$, from 650 $m^2/g$ to 1600 $m^2/g$, from 650 $m^2/g$ to 1500 $m^2/g$, from 650 $m^2/g$ to 1450 $m^2/g$, from 700 $m^2/g$ to 2100 $m^2/g$, from 700 $m^2/g$ to 2000 $m^2/g$, from 700 $m^2/g$ to 1800 $m^2/g$, from 700 $m^2/g$ to 1600 $m^2/g$, from 700 $m^2/g$ to 1500 $m^2/g$, from 700 $m^2/g$ to 1450 $m^2/g$, from 800 $m^2/g$ to 2100 $m^2/g$, from 800 $m^2/g$ to 2000 $m^2/g$, from 800 $m^2/g$ to 1800 $m^2/g$, from 800 $m^2/g$ to 1600 $m^2/g$, from 800 $m^2/g$ to 1500 $m^2/g$, from 800 $m^2/g$ to 1450 $m^2/g$, from 1000 $m^2/g$ to 2100 $m^2/g$, from 1000 $m^2/g$ to 2000 $m^2/g$, from 1000 $m^2/g$ to 1800 $m^2/g$, from 1000 $m^2/g$ to 1600 $m^2/g$, from 1000 $m^2/g$ to 1500 $m^2/g$, from 1000 $m^2/g$ to 1450 $m^2/g$, from 1200 $m^2/g$ to 2100 $m^2/g$, from 1200 $m^2/g$ to 2000 $m^2/g$, from 1200 $m^2/g$ to 1800 $m^2/g$, from 1200 $m^2/g$ to 1600 $m^2/g$, from 1200 $m^2/g$ to 1500 $m^2/g$, or from 1200 $m^2/g$ to 1450 $m^2/g$. BET (Brunauer, Emmett, and Teller) surface area can be determined according to ASTM-D6556. In one embodiment, the oxidized carbon blacks are particulate. In one embodiment, carbon black or oxidized carbon black particles refers to the aggregate of primary particles and not to the primary particles themselves.

In one embodiment, the oxidized carbon blacks have an oil absorption number (OAN) ranging from 35 to 500 $cm^3/100$ g, e.g., from 50 to 500 $cm^3/100$ g, from 75 to 500 $cm^3/100$ g, from 100 to 500 $cm^3/100$ g, from 35 to 400 $cm^3/100$ g, from 50 to 400 $cm^3/100$ g, from 75 to 400 $cm^3/100$ g, from 100 to 400 $cm^3/100$ g, from 35 to 360 $cm^3/100$ g, from 50 to 360 $cm^3/100$ g, from 75 to 360 $cm^3/100$ g, from 100 to 360 $cm^3/100$ g, from 35 to 300 $cm^3/100$ g, from 50 to 300 $cm^3/100$ g, from 75 to 300 $cm^3/100$ g, from 100 to 300 $cm^3/100$ g, from 35 to 275 $cm^3/100$ g, from 50 to 275 $cm^3/100$ g, from 75 to 275 $cm^3/100$ g, from 100 to 275 $cm^3/100$ g, from 35 to 250 $cm^3/100$ g, from 50 to 250 $cm^3/100$ g, from 75 to 250 $cm^3/100$ g, from 100 to 250 $cm^3/100$ g, from 35 to 200 $cm^3/100$ g, from 50 to 200 $cm^3/100$ g, from 75 to 200 $cm^3/100$ g, from 100 to 200 $cm^3/100$ g, from 35 to 170 $cm^3/100$ g, from 50 to 170 $cm^3/100$ g, from 75 to 170 $cm^3/100$ g, or from 100 to 170 $cm^3/100$ g. OAN can be determined according to ASTM-D2414.

In one embodiment, the oxidized carbon blacks have a surface area ranging from 650 to 1500 $m^2/g$, e.g., from 650 to 1450 $m^2/g$, from 700 to 1500 $m^2/g$, or from 700 to 1450 $m^2/g$, and an OAN ranging from 35 to 170 mL/100 g, from 50 to 200 mL/100 g, from 50 to 170 mL/100 g, from 100 to 200 mL/100 g, or from 100 to 170 mL/100 g.

Also disclosed herein is an oxidized carbon black derived from a base carbon black. In one embodiment, the base carbon black has the following properties:

a BET surface area ranging from 650 to 2100 $m^2/g$; and an oil absorption number (OAN) ranging from 35 to 500 mL/100 g.

The oxidized carbon blacks derived from such base carbon blacks can have a volatile content, a total oxygen content, or total titratable acidic group content having any of the values disclosed herein. In one embodiment, "an oxidized carbon black derived from a base carbon black" refers to a product resulting from oxidizing a base carbon black that does not have an appreciable oxygen content, e.g., the base carbon black has a volatile content, a total oxygen content, or total titratable acidic group content less than the values disclosed herein. In one embodiment, the base carbon black has at least one of the following properties: a volatile content less than 5.5 wt. % relative to the total weight of the base carbon black, as determined by weight loss at 950° C., a total oxygen content of less than 3.5 wt. % relative to the total weight of the base carbon black, a total titratable acidic group content of less than 0.5 µmol/m$^2$, as determined by Boehm's titration method, and a total titratable acidic group content of less than 0.5 mmol/g, as determined by Boehm's titration method.

In one embodiment, the oxidized carbon black is derived from a base carbon black, in which the base carbon black has a BET surface area ranging from 650 m$^2$/g to 2100 m$^2$/g, e.g., from 650 m$^2$/g to 2000 m$^2$/g, from 650 m$^2$/g to 1800 m$^2$/g, from 650 m$^2$/g to 1600 m$^2$/g, from 650 m$^2$/g to 1500 m$^2$/g, from 650 m$^2$/g to 1450 m$^2$/g, from 700 m$^2$/g to 2100 m$^2$/g, from 700 m$^2$/g to 2000 m$^2$/g, from 700 m$^2$/g to 1800 m$^2$/g, from 700 m$^2$/g to 1600 m$^2$/g, from 700 m$^2$/g to 1500 m$^2$/g, from 700 m$^2$/g to 1450 m$^2$/g, from 800 m$^2$/g to 2100 m$^2$/g, from 800 m$^2$/g to 2000 m$^2$/g, from 800 m$^2$/g to 1800 m$^2$/g, from 800 m$^2$/g to 1600 m$^2$/g, from 800 m$^2$/g to 1500 m$^2$/g, from 800 m$^2$/g to 1450 m$^2$/g, from 1000 m$^2$/g to 2100 m$^2$/g, from 1000 m$^2$/g to 2000 m$^2$/g, from 1000 m$^2$/g to 1800 m$^2$/g, from 1000 m$^2$/g to 1600 m$^2$/g, from 1000 m$^2$/g to 1500 m$^2$/g, from 1000 m$^2$/g to 1450 m$^2$/g, from 1200 m$^2$/g to 2100 m$^2$/g, from 1200 m$^2$/g to 2000 m$^2$/g, from 1200 m$^2$/g to 1800 m$^2$/g, from 1200 m$^2$/g to 1600 m$^2$/g, from 1200 m$^2$/g to 1500 m$^2$/g, or from 1200 m$^2$/g to 1450 m$^2$/g. BET surface area can be determined according to ASTM-D6556.

In one embodiment, the oxidized carbon blacks have a BET surface area lower than that of the base carbon blacks from which they are derived.

In one embodiment, the oxidized carbon black is derived from a base carbon black, in which the base carbon black has an oil absorption number (OAN) ranging from 35 to 500 cm$^3$/100 g, e.g., from 50 to 500 cm$^3$/100 g, from 75 to 500 cm$^3$/100 g, from 100 to 500 cm$^3$/100 g, from 35 to 400 cm$^3$/100 g, from 50 to 400 cm$^3$/100 g, from 75 to 400 cm$^3$/100 g, from 100 to 400 cm$^3$/100 g, from 35 to 360 cm$^3$/100 g, from 50 to 360 cm$^3$/100 g, from 75 to 360 cm$^3$/100 g, from 100 to 360 cm$^3$/100 g, from 35 to 300 cm$^3$/100 g, from 50 to 300 cm$^3$/100 g, from 75 to 300 cm$^3$/100 g, from 100 to 300 cm$^3$/100 g, from 35 to 275 cm$^3$/100 g, from 50 to 275 cm$^3$/100 g, from 75 to 275 cm$^3$/100 g, from 100 to 275 cm$^3$/100 g, from 35 to 250 cm$^3$/100 g, from 50 to 250 cm$^3$/100 g, from 75 to 250 cm$^3$/100 g, from 100 to 250 cm$^3$/100 g, from 35 to 200 cm$^3$/100 g, from 50 to 200 cm$^3$/100 g, from 75 to 200 cm$^3$/100 g, from 100 to 200 cm$^3$/100 g, from 35 to 170 cm$^3$/100 g, from 50 to 170 cm$^3$/100 g, from 75 to 170 cm$^3$/100 g, or from 100 to 170 cm$^3$/100 g. OAN can be determined according to ASTM-D2414.

In one embodiment, the oxidized carbon black is derived from a base carbon black, in which the base carbon black has a surface area ranging from 650 to 1500 m$^2$/g, e.g., from 650 to 1450 m$^2$/g, from 700 to 1500 m$^2$/g, or from 700 to 1450 m$^2$/g, and an OAN ranging from 35 to 170 mL/100 g, from 50 to 200 mL/100 g, from 50 to 170 mL/100 g, from 100 to 200 mL/100 g, or from 100 to 170 mL/100 g.

In one embodiment, the oxidized carbon black is derived from a base carbon black, in which the base carbon black has a primary particle size ranging from 8 to 50 nm, e.g., from 8 to 40 nm, from 8 to 30 nm, or from 8 to 20 nm. In one embodiment, the oxidized carbon blacks have a primary particle size ranging from 8 to 50 nm, e.g., from 8 to 40 nm, from 8 to 30 nm, or from 8 to 20 nm.

In one embodiment, the oxidized carbon black has a pH of 6 or less, as determined by ASTM D1512. When oxidized carbon blacks are dispersed in water, the pH of the resulting supernatant is typically lowered due to increasing acid or phenol groups. In one embodiment, the oxidized carbon black has a pH ranging from 1.5-6 or a pH ranging from 2-6, as determined by ASTM D1512.

The oxidized carbon black can also be characterized from surface energy analysis (SEP) by measuring the water vapor adsorption using a gravimetric instrument (dynamic water vapor sorption method). In this method, the sample is weighed in a humidity chamber and allowed to equilibrate at a series of step changes in relative humidity while recording the change in mass. The equilibrium mass increase as a function of relative humidity can be used to generate the vapor sorption isotherm. Spreading pressure (in mJ/m$^2$) for a sample is calculated as $\pi_e$/BET, in which:

$$\pi_e = RT \int_0^{p_0} \Gamma \, d\ln p$$

and R is the ideal gas constant, T is temperature, $\Gamma$ is moles of water adsorbed, $p_0$ is the vapor pressure, and p is the partial pressure of the vapor at each incremental step. The spreading pressure is related to the surface energy of the solid and is indicative of the hydrophobic/hydrophilic properties of the solid, with a lower surface energy (SE) corresponding to a higher hydrophobicity. In one embodiment, the oxidized carbon black has a surface energy of at least 25 mJ/m$^2$, e.g., a surface energy ranging from 25 mJ/m$^2$ to 70 mJ/m$^2$, from 25 mJ/m$^2$ to 60 mJ/m$^2$, or from 25 mJ/m$^2$ to 50 mJ/m$^2$.

The crystallite size of the oxidized carbon black can be determined by Raman spectroscopy, e.g., by monitoring two major "resonance" bands of a Raman spectrum at about 1340 cm$^{-1}$ and 1580 cm$^{-1}$, denoted as the "D" and "G" bands, respectively. The crystallite size ($L_a$) can be calculated in Angstroms from the equation:

$$L_a = 43.5 \times (\text{area of } G \text{ band}/\text{area of } D \text{ band}).$$

In one embodiment, the oxidized carbon black has a crystallite size ($L_a$) of at least 16 Å, as determined by Raman spectroscopy. In another embodiment, the oxidized carbon black has a crystallite size ($L_a$) ranging from 16 Å to 23 Å, as determined by Raman spectroscopy.

In one embodiment, the resistance of oxidized carbon black is characterized by its conductivity index, defined according to the following equation (see U.S. Pat. No. 6,820,738):

Conductivity Index=[BET×OAN]$^{1/2}$/[1+volatile content]

The conductivity index is dependent on the BET, OAN, and volatile content, which are described herein. The lower the BET and OAN, the lower the conductivity index and thus, the higher the resistance, whereas lower volatile content would lead to lower resistance of the oxidized carbon black.

In one embodiment, the oxidized carbon black has a conductivity index ranging from 10 to 75, from 15 to 75, from 20 to 75, from 25 to 75, 10 to 70, from 15 to 70, from 20 to 70, from 25 to 70, from 10 to 60, from 15 to 60, from 20 to 60, from 25 to 60, from 10 to 50, from 15 to 50, from 20 to 50, or from 25 to 50.

In another embodiment, the electrical resistance of the oxidized carbon black is characterized by its powder resistivity. In one embodiment, the powder resistivity is obtained at a defined compression by methods known in the art. Powder volume electrical resistivity can calculated at a certain pressure using the following equation:

$$\rho = R \times A / I$$

where ρ is the volume electrical resistivity (Ω-cm), R is the electrical resistance of the powder in (Ω), A is the cross sectional area of the cell (cm²), and I is the distance between two electrodes (cm).

In one embodiment, at a density of 0.8 cm³/g, the oxidized carbon black has a powder resistivity of at least 0.2 Ω-cm or at least 0.25 Ω-cm, e.g., a powder resistivity ranging from 0.2 to 1.5 Ω-cm, from 0.2 to 1.4 Ω-cm, from 0.2 to 1.3 Ω-cm, from 0.2 to 1.2 Ω-cm, from 0.2 to 1.1 Ω-cm, from 0.3 to 1.5 Ω-cm, from 0.3 to 1.4 Ω-cm, from 0.3 to 1.3 Ω-cm, from 0.3 to 1.2 Ω-cm, or from 0.3 to 1.1 Ω-cm.

Another embodiment provides a method of making an oxidized carbon black, comprising:

oxidizing a base carbon black, in which the base carbon black has a BET surface area ranging from 650 to 2100 m²/g and an oil absorption number (OAN) ranging from 35 to 500 mL/100 g, wherein the oxidized carbon black has at least one of the following properties:

(a) a volatile content of at least 5.5 wt. % relative to the total weight of the oxidized carbon black, as determined by weight loss at 950° C.;
(b) a total oxygen content of at least 3.5 wt. % relative to the total weight of the oxidized carbon black;
(c) a total titratable acidic group content of at least 0.5 μmol/m², as determined by Boehm's titration method; and
(d) a total titratable acidic group content of at least 0.5 mmol/g, as determined by Boehm's titration method.

In one embodiment, the oxidizing comprises subjecting the base carbon black to at least one agent selected from oxygen gas, ozone, nitrogen oxides of the formula $N_xO_y$, where x=1-2 and y=1-4 (e.g., NO, $NO_2$, including mixtures with air), persulfates such as sodium, potassium, and ammonium persulfate, hypohalites such as sodium hypochlorite, halites, halates, perhalates such as sodium chlorite, sodium chlorate, or sodium perchlorate, oxidizing acids such as nitric acid, and transition metal-containing oxidants such as permanganate salts, osmium tetroxide, chromium oxides, ceric ammonium nitrates. In one embodiment, the at least one agent comprises at least two or more agents, e.g., oxygen and ozone, etc. In another embodiment, the oxidizing comprises subjecting the base carbon black to at least one agent that is mixed with air.

Another embodiment provides an electrode composition. The electrode composition can coat an electrode plate or current collector. The composition can be combined with other components to form electrodes for lead acid batteries. Accordingly, another embodiment provides an electrode composition comprising:

an oxidized carbon black having a BET surface area ranging from 80 to 2100 m²/g, wherein the oxidized carbon black has a volatile content of at least 3 wt. % relative to the total weight of the oxidized carbon black; and
at least one lead-containing material.

In another embodiment, the electrode composition comprises:

an oxidized carbon black having a BET surface area ranging from 80 to 2100 m²/g, wherein the oxidized carbon black has a total oxygen content of at least 3.5 wt. % relative to the total weight of the oxidized carbon black; and
at least one lead-containing material.

In another embodiment, the electrode composition comprises:

an oxidized carbon black having a BET surface area ranging from 80 to 2100 m²/g, wherein the oxidized carbon black has a total titratable acidic group content of at least 0.5 μmol/m², as determined by Boehm's titration method; and
at least one lead-containing material.

In another embodiment, the electrode composition comprises:

an oxidized carbon black having a BET surface area ranging from 80 to 2100 m²/g, wherein the oxidized carbon black has a total titratable acidic group content of at least 0.5 mmol/g, as determined by Boehm's titration method; and
at least one lead-containing material.

In one or more of these embodiments, the composition can further comprise one or more additional components as described herein, e.g., one or more of an organic molecule expander, $BaSO_4$, and/or $H_2SO_4$.

In one embodiment, the electrode composition comprises the oxidized carbon black having a BET surface area ranging In one embodiment, the oxidized carbon blacks have a BET surface area ranging from 80 m²/g to 2100 m²/g, e.g., from 80 m²/g to 2000 m²/g, from 80 m²/g to 1800 m²/g, from 80 m²/g to 1600 m²/g, from 80 m²/g to 1500 m²/g, from 80 m²/g to 1450 m²/g, from 200 m²/g to 2100 m²/g, from 200 m²/g to 2000 m²/g, from 200 m²/g to 1800 m²/g, from 200 m²/g to 1600 m²/g, from 200 m²/g to 1500 m²/g, from 200 m²/g to 1450 m²/g, from 300 m²/g to 2100 m²/g, from 300 m²/g to 2000 m²/g, from 300 m²/g to 1800 m²/g, from 300 m²/g to 1600 m²/g, from 300 m²/g to 1500 m²/g, from 300 m²/g to 1450 m²/g, from 400 m²/g to 2100 m²/g, from 400 m²/g to 2000 m²/g, from 400 m²/g to 1800 m²/g, from 400 m²/g to 1600 m²/g, from 400 m²/g to 1500 m²/g, from 400 m²/g to 1450 m²/g, from 500 m²/g to 2100 m²/g, from 500 m²/g to 2000 m²/g, from 500 m²/g to 1800 m²/g, from 500 m²/g to 1600 m²/g, from 500 m²/g to 1500 m²/g, from 500 m²/g to 1450 m²/g, from 600 m²/g to 2100 m²/g, from 600 m²/g to 2000 m²/g, from 600 m²/g to 1800 m²/g, from 600 m²/g to 1600 m²/g, from 600 m²/g to 1500 m²/g, from 600 m²/g to 1450 m²/g, from 650 m²/g to 2100 m²/g, 650 m²/g to 2000 m²/g, from 650 m²/g to 1800 m²/g, from 650 m²/g to 1600 m²/g, from 650 m²/g to 1500 m²/g, from 650 m²/g to 1450 m²/g, from 700 m²/g to 2100 m²/g, from 700 m²/g to 2000 m²/g, from 700 m²/g to 1800 m²/g, from 700 m²/g to 1600 m²/g, from 700 m²/g to 1500 m²/g, from 700 m²/g to 1450 m²/g, from 800 m²/g to 2100 m²/g, from 800 m²/g to 2000 m²/g, from 800 m²/g to 1800 m²/g, from 800 m²/g to 1600 m²/g, from 800 m²/g to 1500 m²/g, from 800 m²/g to 1450 m²/g, from 1000 m²/g to 2100 m²/g, from 1000 m²/g to 2000 m²/g, from 1000 m²/g to 1800 m²/g, from 1000 m²/g to 1600 m²/g, from 1000 m²/g to 1500 m²/g, from 1000 m²/g to 1450 m²/g, from 1200 m²/g to 2100 m²/g, from 1200 m²/g to 2000 m²/g, from 1200 m²/g to 1800 m²/g, from 1200 m²/g to 1600 m²/g, from 1200 m²/g to 1500 m²/g, or from 1200 m²/g to 1450 m²/g.

Another embodiment provides an electrode composition comprising an oxidized carbon black derived from a base carbon black, in which the base carbon black has a BET surface area ranging from 80 to 2100 m²/g and at least one lead-containing material. The oxidized carbon blacks derived from such base carbon blacks can have a volatile content, a total oxygen content, or a total titratable acidic group content having any of the values disclosed herein.

In one embodiment, the electrode composition comprises an oxidized carbon black derived from a base carbon black, in which the base carbon black has a BET surface area ranging from 80 m²/g to 2100 m²/g, e.g., from 80 m²/g to 2000 m²/g, from 80 m²/g to 1800 m²/g, from 80 m²/g to 1600 m²/g, from 80 m²/g to 1500 m²/g, from 80 m²/g to 1450 m²/g, from 200 m²/g to 2100 m²/g, from 200 m²/g to 2000 m²/g, from 200 m²/g to 1800 m²/g, from 200 m²/g to 1600 m²/g, from 200 m²/g to 1500 m²/g, from 200 m²/g to 1450 m²/g, from 300 m²/g to 2100 m²/g, from 300 m²/g to 2000 m²/g, from 300 m²/g to 1800 m²/g, from 300 m²/g to 1600 m²/g, from 300 m²/g to 1500 m²/g, from 300 m²/g to 1450 m²/g, from 400 m²/g to 2100 m²/g, from 400 m²/g to 2000 m²/g, from 400 m²/g to 1800 m²/g, from 400 m²/g to 1600 m²/g, from 400 m²/g to 1500 m²/g, from 400 m²/g to 1450 m²/g, from 500 m²/g to 2100 m²/g, from 500 m²/g to 2000 m²/g, from 500 m²/g to 1800 m²/g, from 500 m²/g to 1600 m²/g, from 500 m²/g to 1500 m²/g, from 500 m²/g to 1450 m²/g, from 600 m²/g to 2100 m²/g, from 600 m²/g to 2000 m²/g, from 600 m²/g to 1800 m²/g, from 600 m²/g to 1600 m²/g, from 600 m²/g to 1500 m²/g, from 600 m²/g to 1450 m²/g, from 650 m²/g to 2100 m²/g, 650 m²/g to 2000 m²/g, from 650 m²/g to 1800 m²/g, from 650 m²/g to 1600 m²/g, from 650 m²/g to 1500 m²/g, from 650 m²/g to 1450 m²/g, from 700 m²/g to 2100 m²/g, from 700 m²/g to 2000 m²/g, from 700 m²/g to 1800 m²/g, from 700 m²/g to 1600 m²/g, from 700 m²/g to 1500 m²/g, from 700 m²/g to 1450 m²/g, from 800 m²/g to 2100 m²/g, from 800 m²/g to 2000 m²/g, from 800 m²/g to 1800 m²/g, from 800 m²/g to 1600 m²/g, from 800 m²/g to 1500 m²/g, from 800 m²/g to 1450 m²/g, from 1000 m²/g to 2100 m²/g, from 1000 m²/g to 2000 m²/g, from 1000 m²/g to 1800 m²/g, from 1000 m²/g to 1600 m²/g, from 1000 m²/g to 1500 m²/g, from 1000 m²/g to 1450 m²/g, from 1200 m²/g to 2100 m²/g, from 1200 m²/g to 2000 m²/g, from 1200 m²/g to 1800 m²/g, from 1200 m²/g to 1600 m²/g, from 1200 m²/g to 1500 m²/g, or from 1200 m²/g to 1450 m²/g.

In another embodiment, the electrode composition comprises the oxidized carbon black having an oil absorption number ranging from 35 to 500 cm³/100 g, e.g., from 50 to 500 cm³/100 g, from 75 to 500 cm³/100 g, from 100 to 500 cm³/100 g, from 35 to 400 cm³/100 g, from 50 to 400 cm³/100 g, from 75 to 400 cm³/100 g, from 100 to 400 cm³/100 g, from 35 to 360 cm³/100 g, from 50 to 360 cm³/100 g, from 75 to 360 cm³/100 g, from 100 to 360 cm³/100 g, from 35 to 300 cm³/100 g, from 50 to 300 cm³/100 g, from 75 to 300 cm³/100 g, from 100 to 300 cm³/100 g, from 35 to 275 cm³/100 g, from 50 to 275 cm³/100 g, from 75 to 275 cm³/100 g, from 100 to 275 cm³/100 g, from 35 to 250 cm³/100 g, from 50 to 250 cm³/100 g, from 75 to 250 cm³/100 g, from 100 to 250 cm³/100 g, from 35 to 200 cm³/100 g, from 50 to 200 cm³/100 g, from 75 to 200 cm³/100 g, from 100 to 200 cm³/100 g, from 35 to 170 cm³/100 g, from 50 to 170 cm³/100 g, from 75 to 170 cm³/100 g, or from 100 to 170 cm³/100 g.

In one embodiment, the electrode composition comprises the oxidized carbon black having a volatile content of at least 3 wt. % relative to the total weight of the oxidized carbon black, as determined by a volatile matter test at 950° C. according to DIN 53552. In one embodiment, the volatile content is at least 3.5 wt. %, at least 4 wt. %, at least 4.5 wt. %, at least 5 wt. %, at least 5.5 wt. %, at least 6 wt. %, at least 8 wt. %, at least 10 wt. %, at least 12 wt. %, at least 15 wt. %, at least 20 wt. % relative to the total weight of the oxidized carbon black. In one embodiment, the volatile content ranges from 3 to 25 wt. %, e.g., from 3.5 to 25 wt. %, from 4 to 25 wt. %, from 5 to 25 wt. %, from 5.5 to 25 wt. %, from 6 to 25 wt. %, from 8 to 25 wt. %, from 10 to 25 wt. %, from 12 to 25 wt. %, from 15 to 25 wt. %, from 20 to 25 wt. %, from 3 to 20 wt. %, from 3.5 to 20 wt. %, from 4 to 20 wt. %, from 5 to 20 wt. %, from 5.5 to 20 wt. %, from 6 to 20 wt. %, from 8 to 20 wt. %, from 10 to 20 wt. %, from 12 to 20 wt. %, or from 15 to 20 wt. %, relative to the total weight of the oxidized carbon black.

In one embodiment, the at least one lead-containing material is selected from lead, PbO, leady oxide, $Pb_3O_4$, and $PbSO_4$, hydroxides thereof, acids thereof, other polymetallic lead complexes thereof. In one embodiment, the at least one lead-containing material can be leady oxide, which comprises primarily PbO and lead. During manufacture of the electrode composition, $PbSO_4$ is generated in a reaction between the leady oxide and $H_2SO_4$.

In one embodiment, the oxidized carbon black is present in the composition in an amount (loading) ranging from 0.05% to 3% by weight, relative to the total weight of the composition, e.g., an amount ranging from 0.05% to 2.5%, from 0.05% to 2%, from 0.05% to 1.5%, from 0.05% to 1%, from 0.05% to 0.5%, from 0.1% to 3%, from 0.1% to 2.5%, from 0.1% to 2%, from 0.1% to 1.5%, from 0.1% to 1%, from 0.1% to 0.5%, from 0.2% to 3%, from 0.2% to 2.5%, from 0.2% to 2%, from 0.2% to 1.5%, from 0.2% to 1% from 0.2% to 0.5%, from 0.5% to 3%, from 0.5% to 2.5%, from 0.5% to 2%, from 0.5% to 1.5%, from 0.5% to 1%, from 1% to 3%, from 1% to 2.5%, from 1% to 2%, from 1% to 1.5%, from 1.5% to 3%, from 1.5% to 2.5%, from 1.5% to 2%, from 2% to 3%, or from 2% to 2.5%, by weight, relative to the total weight of the composition.

In one embodiment, oxidized carbon blacks can be blended with other forms of carbon, including but not limited to carbon black, activated carbon, expanded graphite, graphene, few layer graphene, carbon nanotubes, carbon fibers, carbon nanofibers, and graphite, so long as the amount of oxidized carbon black is present in the amounts disclosed herein, e.g., ranging from 0.05 to 3 wt. % relative to the total weight of the composition.

The composition can further comprise other components including one or more of least one organic molecule expander, $H_2SO_4$, and $BaSO_4$. In one embodiment, the electrode composition comprises at least the lead-containing material and oxidized carbon black interspersed (e.g., homogeneously interspersed) with each other, e.g., the oxidized carbon black and the lead-containing are particulate. In one embodiment, none of the components of the mixture are provided as layers or coatings. In one embodiment, other components of the electrode composition (e.g., $BaSO_4$ and/or $H_2SO_4$) are homogeneously interspersed with the lead-containing material and oxidized carbon black.

"Organic molecule expander" as defined herein is a molecule capable of adsorbing or covalently bonding to the surface of a lead-containing species to form a porous network that prevents or substantially decreases the rate of formation of a smooth layer of $PbSO_4$ at the surface of the lead-containing species. In one embodiment, the organic molecule expander has a molecular weight greater than 300 g/mol. Exemplary organic molecule expanders include lignosulfonates, lignins, wood flour, pulp, humic acid, and wood products, and derivatives or decomposition products thereof. In one embodiment, the expander is selected from lignosulfonates, a molecule having a substantial portion that contains a lignin structure. Lignins are polymeric species comprising primarily phenyl propane groups with some number of methoxy, phenolic, sulfur (organic and inorganic), and carboxylic acid groups. Typically, lignosulfonates are lignin molecules that have been sulfonated. Typical lignosulfonates include the Borregard Lignotech products UP-393, UP-413, UP-414, UP-416, UP-417, M, D, VS-A (Vanisperse A), VS-HT, and the like. Other useful exemplary lignosulfonates are listed in, "Lead Acid Batteries", Pavlov, Elsevier Publishing, 2011, the disclosure of which is incorporated herein by reference.

In one embodiment, the organic molecule expander is present in the electrode composition in an amount ranging from 0.1% to 1.5% by weight relative to the total weight of the composition, e.g., from 0.2% to 1.5% by weight, from 0.2% to 1% by weight, from 0.3% to 1.5% by weight, from 0.3% to 1% by weight, or from 0.3% to 0.8% by weight relative to the total weight of the composition.

In one embodiment, both the oxidized carbon black and the organic molecule expander are present in the electrode composition in an amount ranging from 0.1 to 5% by weight relative to the total weight of the composition, e.g., from 0.1% to 4%, from 0.1% to 3%, from 0.1% to 2%, from 0.1% to 1.5% by weight. In another embodiment, the oxidized carbon black is present in an amount ranging from 0.2% to 1.5% by weight relative to the total weight of the composition, e.g., from 0.3% to 1.5% by weight, and the organic molecule expander is present in an amount ranging from 0.2% to 1.5% by weight, from 0.3% to 1.5% by weight, from 0.2% to 1% by weight, or from 0.3% to 1% by weight relative to the total weight of the composition.

Another embodiment provides a method of making an electrode composition. In one embodiment, the method comprises combining the oxidized carbon black with the lead-containing material, expander, and optionally other components (e.g., $BaSO_4$) as a dry mixture with subsequent addition of sulfuric acid and/or water (either simultaneously or sequentially in any order) to this dry mixture. In another embodiment, the method comprises combining a lead-containing material, an organic molecule expander, $BaSO_4$, and subsequently sulfuric acid and/or water (either simultaneously or sequentially in any order), to form a slurry. Regardless of the method used, the result is an intermediate in the form of a paste or slurry that can be used to coat a substrate.

In one embodiment, the paste or slurry is deposited onto a substrate, e.g., an electrode plate or current collector, such as a grid and allowed to dry on the substrate to form the electrode. In one embodiment, the grid is a metallic structures that come in a myriad of designs and shapes (e.g., punched or expanded from sheets), functioning as the solid permanent support for the active material. The grid also conducts electricity or electrons to and away from the active material. Grids can comprise pure metals (e.g., Pb) or alloys thereof. The components of those alloys can comprise Sb, Sn, Ca, Ag, among other metals described in "Lead Acid Batteries," Pavlov, Elsevier Publishing, 2011, the disclosure of which is incorporated herein by reference.

In one embodiment, after deposition onto the substrate, the paste intermediate is dried. In one embodiment, the drying is achieved by a slow cure, such as under controlled humidity conditions and a moderate amount of heat (e.g., from 30° C. to 80° C. or from 35° C. to 60° C.) under controlled humidity, resulting in a porous solid. The curing step can then followed by a second heating step (drying) at an elevated temperature (e.g., from 50° C. to 140° C. or from 65° C. to 95° C.) at extremely low humidity, or even zero humidity. In one embodiment, the composition is a monolith. Other pasting, curing, and formation procedures are described in "Lead Acid Batteries," Pavlov, Elsevier Publishing, 2011, the disclosure of which is incorporated herein by reference.

Another embodiment comprises an electrode comprising the oxidized carbon blacks disclosed herein. In one embodiment, an electrode comprising the oxidized carbon black refers to an electrode plate coated with a composition comprising the oxidized carbon black. The electrode can be an anode. Another embodiment comprises a cell or lead acid battery comprising the electrode or composition disclosed herein, e.g., an electrode plate coated with a composition comprising the oxidized carbon black. The lead acid battery can further comprise an electrolyte comprising at least one electrolyte additive selected from zinc, sodium, and potassium ions. In one embodiment, the at least one electrolyte additive is present in the electrolyte in an amount ranging from 0.1 to 3 wt. %, relative to the total weight of the electrolyte.

Controlling water loss is one consideration in the design of low-maintenance or maintenance-free lead acid batteries. Water loss in lead acid batteries largely occurs during charge and overcharge and typically results from evolution and/or grid corrosion of hydrogen on the negative plate and oxygen evolution on the positive plate. The addition of a carbonaceous material in the negative plates typically leads to increased water loss, the extent largely depending on the amount and type of carbon (e.g., surface area and morphology). In general terms, a relationship between the rate of hydrogen evolution and negative plate potential can be illustrated with the Butler-Vollmer equation:

$$I = -A \cdot i_0 \cdot \exp[-\alpha_c nF/RT(E-E_{eq})] \qquad (1)$$

where the rate of hydrogen evolution is given by the (cathodic) current I; the (electrochemically active) surface area is given by A; $i_0$ is the exchange current density; n represents the number of electrons exchanged in the reaction; $\alpha_c$ is the symmetry factor for the reaction; $E_{eq}$ represents the equilibrium potential for the reaction; and E is the electrode potential during the overcharge conditions.

From equation (1), it can be seen that there are two material-specific parameters that affect the rate of hydrogen evolution: (i) material specific inherent activity of the electrode component toward the hydrogen evolution, as indicated by the exchange current density ($i_0$), and (ii) morphological properties of the material that influence the (electrochemically active) surface area A. In the case of the negative electrodes containing carbonaceous materials, hydrogen evolution can occur on both the lead and carbon surface. Relative contributions of individual components will be determined by their intrinsic activity (that is combination of inherent catalytic activity and surface area) at a given electrode potential.

One embodiment provides a cell or battery comprising an electrode comprising the oxidized carbon blacks disclosed herein, e.g., an electrode plate coated with a composition comprising the oxidized carbon black disclosed herein, in which the cell or battery has reduced water loss (e.g., at least 10%) compared to a cell or battery having an electrode comprising the base carbon black. Water loss can be measured as weight loss after overcharging a battery at 14.4V for a period of time, e.g., at least 3, 4, or 6 weeks in a 60° C. water bath. The extent of water loss can depend on factors inherent to the electrode material, e.g., surface area of the oxidized carbon black, and loading in the paste formulation, in addition to other factors such as the positive and negative plate potentials during (over)charge, and the presence of certain metal impurities in the acid electrolyte, grids, and other electrode components. A cell or battery having an electrode comprising the base carbon black typically results in increased water loss compared to a cell or battery without the base carbon black. The present composition, when incorporated into an electrode for a cell and lead acid battery, reduces the level of water loss by at least 10%, at least 25%, at least 50%, at least 75%, or by at least 90%, compared to a cell or battery having an electrode comprising the base carbon black. In one embodiment, the battery having an electrode comprising the oxidized carbon black achieves reduced water loss over a period of at least 3 weeks by at least 10% (e.g., at least 25%, at least 50%, at least 75%, or by at least 90%) compared to a battery having an electrode comprising the base carbon black.

Without wishing to be bound by any theory, addition of carbon to the negative plate alters the electrode morphology. This alteration typically results in increased surface area of the negative plate A, which according to the equation (1), further results in an increased rate of hydrogen evolution and accelerated water loss. Without wishing to be bound by any theory, the increased surface area could result from the simple physical addition of carbon, which can be a high surface area component, or from an increased surface area of lead phase facilitated by addition of carbon particles to the negative plate. In the absence of other interactions (e.g., exchange current density ($i_0$) of individual components does not change as a result of mixing), the total hydrogen evolution rate and concomitant water loss can be largely determined by the partition of total (electrochemically) active surface area A between two phases, lead and carbon. However, it is also possible that the particles formed by lead and carbon phase could have different inherent rate of hydrogen evolution. Mitigation of the water loss therefore could proceed through several different paths. Without wishing to be bound by any theory, water loss mitigation could be achieved by modification of inherent activity of carbon after forming surface carbon-oxygen containing groups as the result of oxidation step. Alternatively, interaction between lead and carbon could be changed in the presence of carbon-oxygen surface groups on carbon black. This modification could be selectively aimed at reduction of electrochemically active surface area A, or at selective modification of inherent (electrocatalytic) activity of carbon surfaces for hydrogen evolution.

One embodiment provide an oxidized carbon black having at least one of the following properties:
(a) a volatile content of at least 5.5 wt. % relative to the total weight of the oxidized carbon black, as determined by weight loss at 950° C.;
(b) a total oxygen content of at least 3.5 wt. % relative to the total weight of the oxidized carbon black;
(c) a total titratable acidic group content of at least 0.5 µmol/m², as determined by Boehm's titration method; and
(d) a total titratable acidic group content of at least 0.5 mmol/g, as determined by Boehm's titration method, wherein the oxidized carbon black has a surface area ranging from 650 to 2100 m²/g, and an oil absorption number (OAN) ranging from 35 to 200 mL/100 g.

In one embodiment, the oxidized carbon black has a surface area ranging from 650 to 1500 m²/g, e.g., from 650 to 1450 m²/g, from 700 to 1500 m²/g, or from 700 to 1450 m²/g. In one embodiment, the oxidized carbon black has an OAN ranging from 35 to 170 mL/100 g, from 50 to 200 mL/100 g, from 50 to 170 mL/100 g, from 100 to 200 mL/100 g, or from 100 to 170 mL/100 g. In one embodiment, the oxidized carbon black has a conductivity index ranging from 10 to 70 or from 20 to 70.

Another embodiment provides an oxidized carbon black having at least one of the following properties:
(a) a volatile content of at least 5.5 wt. % relative to the total weight of the oxidized carbon black, as determined by weight loss at 950° C.;
(b) a total oxygen content of at least 3.5 wt. % relative to the total weight of the oxidized carbon black;
(c) a total titratable acidic group content of at least 0.5 µmol/m², as determined by Boehm's titration method; and
(d) a total titratable acidic group content of at least 0.5 mmol/g, as determined by Boehm's titration method, wherein the oxidized carbon black has a surface area ranging from 650 to 2100 m²/g, and a conductivity index ranging from 10 to 70 (e.g., from 20 to 70).

In one embodiment, the oxidized carbon black has a surface area ranging from 650 to 1500 m²/g, e.g., from 650 to 1450 m²/g, from 700 to 1500 m²/g, or from 700 to 1450 m²/g. In one embodiment, the oxidized carbon black has an OAN ranging from 35 to 170 mL/100 g, from 50 to 200 mL/100 g, from 50 to 170 mL/100 g, from 100 to 200 mL/100 g, or from 100 to 170 mL/100 g.

EXAMPLES

Example 1

This Example describes the preparation of oxidized carbon blacks from a hydrogen peroxide process ("Oxidized A").

A 4 L plow mixer (Processall, 4H/V Tilt-A-Mix® mixer) was loaded with 200 g PBX™ 51 carbon black (available from Cabot Corporation; BET surface area of 1540 m²/g and OAN of 160 mL/100 g). The temperature was set to 65° C. With plow turning, 300 g of 35 wt. % hydrogen peroxide (Fisher Scientific) was slowly added to the mixer. The product was mixed for 30 min at 65° C. at 100 rpm and discharged on a Pyrex® tray. The material was placed in an oven and dried at 100° C. for 2 hours.

Example 2

This Example describes the preparation of oxidized carbon blacks with 5 wt. % nitric acid (sample "Oxidized B").

The carbon black of Example 1 (50 g) was contacted with 50 mL of nitric acid (5 wt. % aqueous solution) in a centrifuge tube. The centrifuge tube was shaken to wet all of the carbon black followed by mixing for 1 minute with a vortex mixer. After 24 hours, the mixture was then centrifuged at 3000 rpm for 2 minutes. The supernatant was poured off and the centrifuge tube was refilled with nanopure water to a volume of 50 mL as a water wash. The vortex mixer was used to break up the plug from the centrifugation step and partially disperse the carbon black into water. The mixture was then centrifuged at 3000 rpm for 2 minutes. The water washing step was repeated two additional times and the resulting sample was dried at 100° C. overnight.

Example 3

This Example describes the preparation of oxidized carbon blacks with 70 wt. % nitric acid (samples "Oxidized C-F").

The carbon black of Example 1 (50 g) was placed in a teflon mixing cup (0.5 L). Nitric acid (70% strength, ACS reagent grade from Sigma Aldrich) was added drop-wise to the carbon black with mixing conducted with an overhead pin mixer at 20 rpm, where the nitric acid loading was varied to generate surface oxidized carbon blacks with various levels of surface oxidation. For example, "Oxidized C" was prepared with 49 g of nitric acid solution per 50 g of carbon black; "Oxidized D" was prepared with 67 g of nitric acid per 50 g of carbon black, and "Oxidized E" was prepared with 81 g of nitric acid per 50 g carbon black.

A carbon black having a BET surface area of 500 m$^2$/g and an OAN 100 mL/100 g was subjected to a similar process with 50 g of nitric acid solution per 50 g of carbon black ("Oxidized F").

After addition of nitric acid, mixing was continued for 30 min, after which the mixture was then carefully discharged onto a Pyrex® tray. The sample was placed in a 200° C. oven for 2 hours. To test for residual nitrates to confirm full completion of the oxidation reaction, Soxhlet extraction was performed on 5 g of the resulting oxidized carbon black particles with water over a 16 h period, followed by ion chromatography analysis of the extract solution. Typically, the nitrate levels were below 250 ppm.

Example 4

This Example describes the characterization of the oxidized carbon black samples of Examples 1-3.

BET surface area was determined according to ASTM-D6556. The pH was determined by dispersing a known amount of carbon black in water and measuring the pH of the aqueous phase using a pH probe (ASTM D1512). The oil adsorption number (OAN) was measured by a standard test method ASTM D2414. The volatile matter (volatile content) was determined at 950° C. according to DIN 53552. The surface energy was measured by Dynamic Vapor Sorption with a Surface Measurement Systems DVS1 instrument (SMS Instruments, Monarch Beach, Calif.). Further details on the surface energy measurement can be found in PCT Publication No. WO 2006/124773 (e.g., paragraphs [0021] and [0022]), the disclosure of which is incorporated by reference herein.

The carbon black to be analyzed (100 mg) was dried in an oven at 125° C. for 30 minutes. After ensuring that the incubator in the Surface Measurement Systems DVSI instrument (supplied by SMS Instruments, Monarch Beach, Calif.) had been stable at 25° C. for 2 hours, sample cups were loaded in both the sample and reference chambers. The target RH was set to 0% for 10 minutes to dry the cups and to establish a stable mass baseline. After discharging static and taring the balance, approximately 8 mg of carbon black was added to the cup in the sample chamber. After sealing the sample chamber, the sample was allowed to equilibrate at 0% RH. After equilibration, the initial mass of the sample was recorded. The relative humidity of the nitrogen atmosphere was then increased sequentially to levels of approximately 5, 10, 20, 30, 40, 50, 60, 70, 78, 87, and 92% RH, with the system allowed to equilibrate for 20 minutes at each RH level. The mass of water adsorbed at each humidity level was recorded, from which water spreading pressure was calculated (see above). The measurement was done twice on two separate samples and the average value is reported.

The crystallite size of carbon black (size of ordered domains of microcrystalline carbon black), can be by determined by Raman spectroscopy according to Gruber et al., "Raman studies of heat-treated carbon blacks," Carbon Vol. 32 (7), pp. 1377-1382, 1994, the disclosure of which is incorporated by reference herein. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon and the G band to graphitic or "ordered" sp$^2$ carbon. Using an empirical approach, the ratio of the G/D bands and the crystallite size measured by X-ray diffraction (XRD) are highly correlated, and regression analysis gives the empirical relationship:

$$L_a = 43.5 \times (\text{area of } G \text{ band/area of } D \text{ band}),$$

in which $L_a$ is the crystallite size calculated in Angstroms. Thus, a higher $L_a$ value corresponds to a more ordered crystalline structure.

The Total Oxygen content was determined by a standard inert gas fusion method using a LECO® TCH600 analyzer and reported in weight percent. Samples of carbon black were dried at 125° C. for 1 hour prior to the analysis. The measurements were conducted in a nickel capsule using a LECO® crucible (model #782-720). The sample was placed in an impulse furnace where the capsule containing the sample was first flushed with helium for about 20 seconds and then heated to 3000° C. in the inert helium atmosphere. The evolved oxygen in forms of CO and $CO_2$ was determined by non-dispersive infrared gas analyzer. An oxygen standard (LECO 502-399 with 1.09 wt. % total oxygen) was used as a control for the measurements.

The data for samples Oxidized A-F compared with PBX™ 51 carbon black ("CB") is listed in Table 1 below.

TABLE 1

| Samples | BET, m$^2$/g | pH | SEP, mJ/m$^2$ | $L_a$, Å | Total Oxygen, wt. % | Volatile Content, wt. % |
|---|---|---|---|---|---|---|
| CB | 1540 | 9.1 | 11.4 | 19 | 1.3 | 2.2 |
| Oxidized A | 1520 | 7.1 | 22.4 | 20 | 3.1 | 5.28 |
| Oxidized B | 1415 | 5.2 | 28.4 | 20 | 4.8 | 9.5 |
| Oxidized C | 1382 | 2.45 | 36.2 | 18 | 9.8 | 12 |
| Oxidized D | 1340 | 2.13 | 41.4 | 18 | 12.2 | 15.5 |
| Oxidized E | 1287 | 1.98 | 42.5 | 18 | 14.4 | 16 |
| Oxidized F | 560 | 2.4 | 55.1 | 19 | 8.2 | 9.8 |

Carbon black samples with different levels of oxidation were prepared. The Oxidized A sample had the lowest oxygen content among the oxidized carbon black in the study. The samples oxidized with nitric acid showed pronounced changes in product pH, volatile content, total oxygen content, SEP and BET as a result of the surface oxidation. Finally, it can be seen that surface energy increases with increasing oxidation, which is consistent with the greater hydrophilicity of the oxidized carbon surface.

The total titratable acidic group content on oxidized carbon black was determined by the Boehm titration method in which 0.3 grams of carbon black was separately equilibrated with 50 mL of aqueous solutions of NaOH, $Na_2CO_3$, $NaHCO_3$ bases in a 60 mL Nalgene bottle for 24 hours. Each mixture was then filtered using disposable 0.2 μm filters, and an excess quantity of HCl was added to a known quantity of the filtrate. Each solution was then boiled for 30 minutes to remove all adsorbed $CO_2$. Then, each solution was "back"

titrated with 0.05 M NaOH. The amount of the original base remaining was calculated by subtracting the original amount of hydrochloric acid added from the amount of sodium hydroxide used for the titration. Additional precautions were taken to minimize $CO_2$ contamination of the three bases. All dilutions of bases were handled in a nitrogen filled glove bag and the dilutions were made with water that had been boiled and degassed with nitrogen. Each base was assigned its own Metrohm dosing unit and these dosing units were filled then sealed inside the glove bag, thus, preventing any air exposure for the basic solutions. The detailed procedure for Boehm's titration has been well described, for example see Goertzen, S. L., Carbon, 48, 1252 (2010); and Oickle, A. M., Carbon, 48, 3313 (2010). The amount of surface carboxylic acid, lactones and phenol groups of oxidized carbon black were calculated from titration results following Boehm's method (for example, see Boehm, H. P., Angew. Chem. 10, 669, (1964); Boehm, H. P., Carbon 32, 759 (1994). The total titratable acidic group content was calculated as a sum of carboxylic acid, lactone and phenols. By definition, the total titratable acidic group content is also equivalent to the amount of NaOH used for the neutralization of oxidized carbon black (determined as mmol of NaOH used for the neutralization of a given mass of oxidized carbon black with Boehm's method).

The content of functional groups for samples Oxidized A-F is reported in Table 2 as mmol/g and as $\mu mol/m^2$ and compared against PBX™ 51 carbon black ("CB").

TABLE 2

| Samples | Carboxylic acids | | Lactones | | Phenols | | Total Titratable Acidic Group Content | |
|---|---|---|---|---|---|---|---|---|
| | mmol/g | $\mu mol/m^2$ | mmol/g | $\mu mol/m^2$ | mmol/g | $\mu mol/m^2$ | mmol/g | $\mu mol/m^2$ |
| CB | 0.04 | 0.026 | 0.07 | 0.046 | 0.03 | 0.02 | 0.15 | 0.097 |
| Oxidized A | 0.11 | 0.072 | 0.14 | 0.092 | 0.07 | 0.046 | 0.32 | 0.21 |
| Oxidized C | 0.70 | 0.51 | 0.56 | 0.41 | 0.40 | 0.29 | 1.67 | 1.21 |
| Oxidized D | 0.93 | 0.69 | 0.71 | 0.53 | 0.41 | 0.31 | 2.05 | 1.53 |
| Oxidized E | 1.11 | 0.86 | 0.76 | 0.59 | 0.46 | 0.36 | 2.34 | 1.82 |
| Oxidized F | 0.5 | 0.89 | 0.3 | 0.54 | 0.21 | 0.38 | 1.01 | 1.8 |

The Boehm titration method shows a trend similar to the inert gas fusion method, in that the Oxidized A sample has the lowest total oxygen content of the oxidized carbon blacks tested herein, whether on a weight basis or surface area basis. A progressively higher level of surface acidic groups was observed, in line with the available volatile content data and total oxygen results for these samples. For "Oxidized F", the normalization of the concentration of surface acidic group to material (BET) surface area showed very similar level of surface treatment as in the case of "Oxidized E" sample.

Powder electrical resistivity measurements were conducted under compression by using a four probe setup. Procedures for carbon black and carbonaceous powders are described in J. Sanchez-Gonzales et al., Carbon 43 (2005), 741-747, and A. Celzard et al., Carbon 40 (2002), 2801].

Here the powder samples were pre-dried at 125° C. for 30 min. The samples were placed in a hollow HDPE cylindrical cells with inner diameter of 1.13 cm and weighed. Each sample was compressed between two brass pistons in the tube using a digital load cell press (Load Cell E-Z Press, International Crystal Laboratories).

The compression pressure was regulated by applying the load up to 2000 lbs with increments of 100 lbs on the cell that was fixed vertically in the press. At every compression the voltage drop between two electrodes was measured (at source current of 1 mA, Keithley 2601A Source Meter) and electrical resistance was calculated. Measurements were conducted at several current values to make sure the conduction was ohmic.

Figure 1:
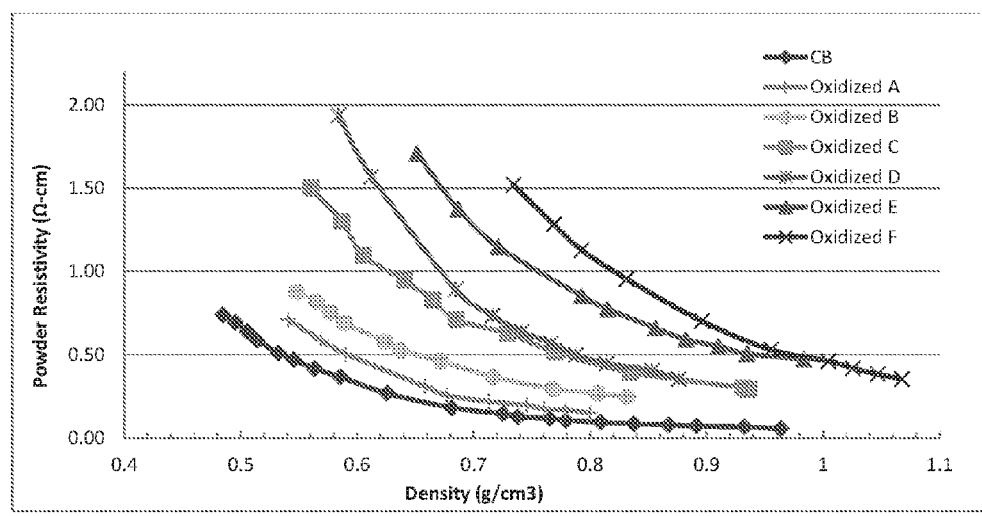
FIG. 1 is a plot of powder resistivity (Ω-cm) versus density (g/cm$^3$) for the samples of Example 4.

Calculation of the density of the compressed powder with known mass requires the knowledge of its volume. A cathetometer was used to measure the displacement of the top piston at every pressure setting, which allowed to calculate the volume (V) of the compressed sample according to the following equation:

$$V = A \times h$$

where A is the cross section area of the cell ($cm^2$), and h is the height of the compressed powder (cm) obtained by cathetometer. FIG. 1 is a plot of powder resistivity versus density of the compressed powder in which resistivity decreased with increasing density.

Table 3 below lists the results of the powder resistivity measurements as well as the conductivity index for the samples of Table 1. The powder resistivity values are listed at a density of 0.8 $cm^3/g$.

TABLE 3

| Samples | Conductivity Index | Powder Resistivity at 0.8 $cm^3/g$, $\Omega$-cm |
|---|---|---|
| CB | 165 | 0.095 |
| Oxidized A | 83 | 0.15 |

TABLE 3-continued

| Samples | Conductivity Index | Powder Resistivity at 0.8 $cm^3/g$, $\Omega$-cm |
|---|---|---|
| Oxidized B | 48 | 0.3 |
| Oxidized C | 38 | 0.46 |
| Oxidized D | 30 | 0.47 |
| Oxidized E | 28 | 0.83 |
| Oxidized F | 22 | 1.08 |

Figure 2:
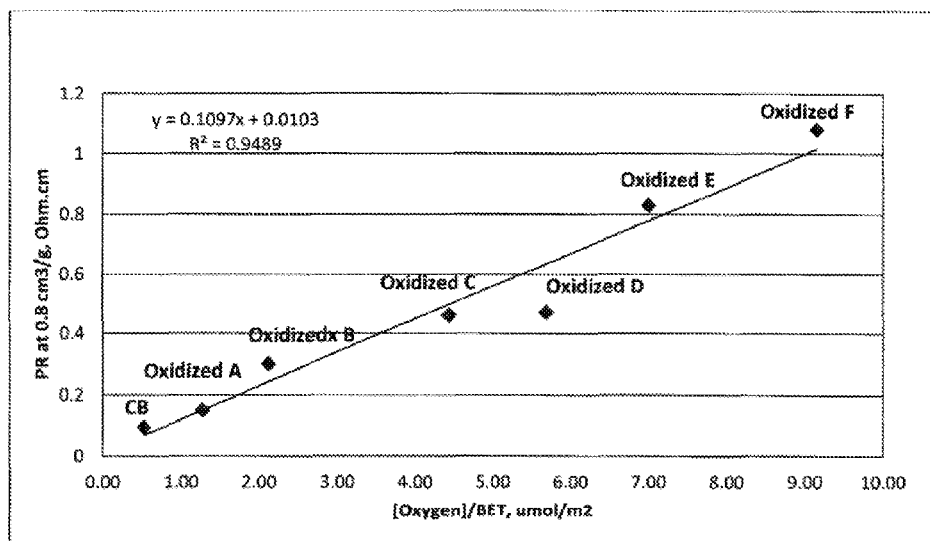
FIG. 2 is a plot of powder resistivity (Ω-cm) versus normalized oxygen content ([oxygen]/BET, μmol/m$^2$) for the samples of Example 4.
Figure 3:
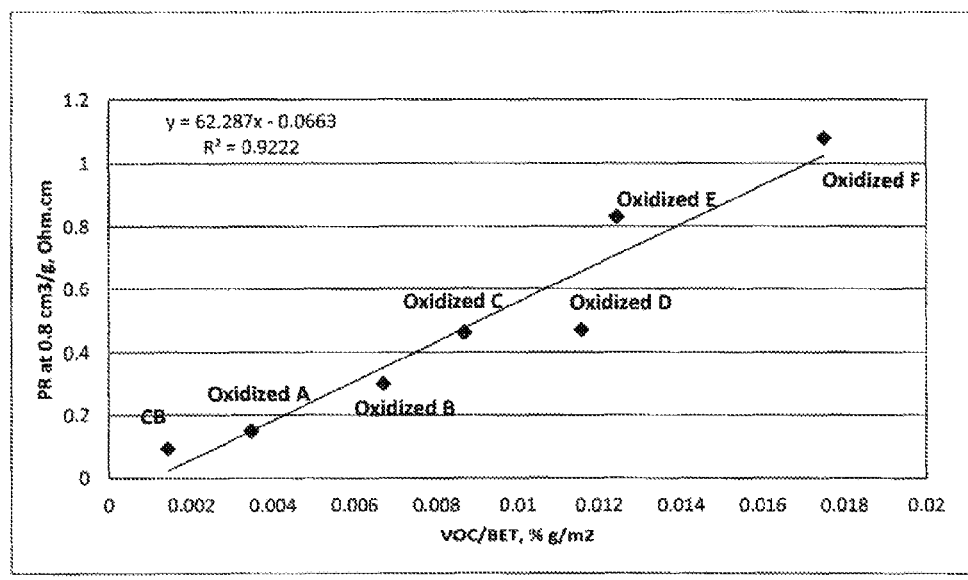
FIG. 3 is a plot of powder resistivity (Ω-cm) versus normalized volatile content, (volatile content/BET, % g/m$^2$) for the samples of Example 4.

It can be seen that with increasing oxidation levels, the powder resistivity increases with concurrent decrease in the conductivity index. This trend is further illustrated in plots of powder resistivity (PR) versus normalized oxygen content (FIG. 2), or normalized volatile content (FIG. 3). The normalized oxygen content data of FIG. 2 was calculated from the total oxygen content/BET surface area data of Table 1 and reported in units of $\mu mol/m^2$. The normalized volatile content of FIG. 3 was calculated from the volatile content/BET surface area values of Table 1 and reported in units of % $g/m^2$. In both FIGS. 2 and 3, a fitted curve shows a linear relationship between powder resistivity as a function of either oxygen concentration and volatile content. The plots show that the powder resistivity increases with increasing the oxygen or volatile content of the carbon.

Example 5

This Example describes cyclic voltammetry (CV) measurements for samples Oxidized A-F compared with PBX™ 51 carbon black ("CB").

For each sample, a 5 wt. % solids slurry was prepared by mixing the carbon black or oxidized carbon black (0.45 g), with polyvinylenedifluoride (PVDF, 0.5 g of 10 wt. % solution in N-methylpyrolidinone (NMP)), and NMP (9 g) for 20 minutes in a THINKY™ ARE-310 planetary mixer. Graphite rods were coated with 40 μL of the slurry, resulting in a coating amount of 2.75+/0.05 mg. Evaporating the NMP at 80° C. for 1 h resulted in a dry coating containing 90 wt. % carbon black, and 10 wt. % PVDF. The coated graphite rods were used as a working electrode in a three electrode jacketed electrochemical cell using uncoated graphite rod as counter electrode and standard calomel electrode (SCE) as a reference electrode. The cell temperature was maintained at 60° C. by water circulation, and cyclic voltammetry (CV) experiments were conducted by scanning the working electrode at 10 mV/s from equilibrium potential to +0.4V then −0.8V vs. SCE for 3 cycles. The plots were normalized to the capacitive current at +0.4V to allow a comparison of all the currents at the same electrochemical surface area. This eliminates the effect of variations in coating weight or BET specific surface area of the carbon blacks.

Table 4 below shows the values for current of hydrogen evolution reaction at −0.6 V vs. SCE for the third CV cycle (I HER, mA/mA) for samples Oxidized A-F compared against PBX™ 51 carbon black ("CB").

TABLE 4

| Samples | Normalized I HER<br>I HER at −0.6 V vs.<br>SCE, mA/mA |
| --- | --- |
| CB | 2.25 |
| Oxidized A | 2.23 |
| Oxidized B | 1.74 |
| Oxidized C | 1.57 |
| Oxidized D | 1.33 |
| Oxidized E | 1.32 |
| Oxidized F | 1.66 |

Figure 4:
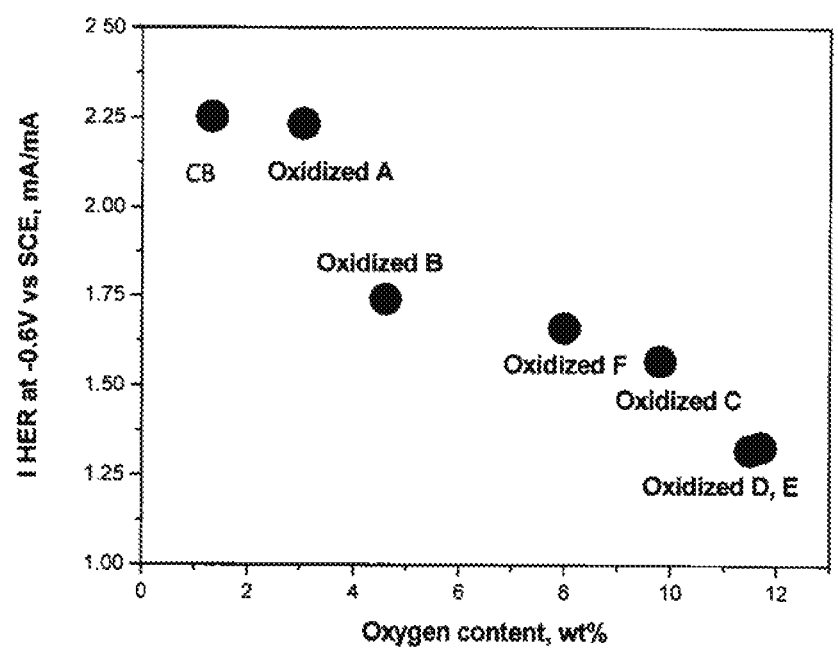
FIG. 4 is a plot of normalized hydrogen evolution reaction current (I HER) in mA/mA at −0.6V (vs. SCE), versus oxygen content (wt. %) for the compositions of Example 5.

The results of Table 4 are plotted in FIG. 4, which shows normalized I HER as a function of oxygen content. It can be seen that the hydrogen reduction current decreases with increasing oxygen content, indicative of decreasing hydrogen evolution. It would be expected that water loss would correspondingly decrease by incorporating oxidized carbon blacks of higher oxygen content. This is illustrated in FIG. 5, which is a plot of the normalized I HER versus conductivity index (see Table 3). It can be seen that samples with higher oxygen content (samples Oxidized B-F) have a correspondingly smaller conductivity index value and generate a lower I HER FIG. 5, which would be expected to reduce water loss. These samples occupy distinct quadrant, as indicated by the outlined area in FIG. 5. In contrast, the samples with a lower oxygen content (sample Oxidized A and control carbon black "CB") have a higher conductivity index and generate high hydrogen reduction current that are outside of the distinctly different quadrant defined for the samples with the low conductivity index and reduced water loss. Thus Oxidized A and control carbon black "CB" samples would be expected to result in higher water loss.

Example 6

This Example describes the preparation of single cells containing the sample Oxidized B compared against PBX™ 51 carbon black ("CB") and a control cell without any carbon black. The single cells were tested for overcharge, dynamic charge acceptance (DCA), and cold crank testing.

Negative active mass (NAM) paste mixing was done at 1 kg scale. PbO (1 kg) was added into an Eirich EL1 mixer and mixed for 1 min, followed by the addition of sodium lignosulfonate (Vanisperse A, 2 g for 0.2 wt. %) and barium sulfate (8 g for 0.8 wt. %). All wt. % loading are vs. PbO. The carbon black (5 g for 0.5 wt. %), pre-wetted with 12 g water, was then added to the mixer and mixed for 3 min, followed by the addition of water (140 mL) and additional mixing for 10 min. Finally, sulfuric acid (80 mL, 1.4 g/cm$^3$) was added slowly over a 13 min period with the addition of extra water as needed to adjust consistency. The paste was then mixed for 25 min. A positive electrode paste was made according to the same procedure but without carbon black, barium sulfate or sodium lignosulfonate.

Electrodes were hand-pasted with 22 g wet paste on a 5.5×5 cm$^2$ Pb—Sn—Ca alloy grid (98.86% lead, 1.1% tin and 0.04% calcium). Electrodes were cured in a Tenney TR2C humidity controlled oven. The curing protocol was the same for positive and negative plates: 72 h at 35° C., 95% RH, followed by 24 h at 60° C., 10% RH. The NAM weight after curing was typically 20 g per plate.

Cells were assembled by torch welding two negative and three positive plates together. Positive plates were wrapped in commercially available automotive polyethylene-rubber separator (Daramic DRCM-200A328). Electrode and separator stacks were inserted in polymethylmethacrylate cases and compressed with Nylon mesh shims. Case lids were screwed on with 2 mm diameter vent openings. Completed cells were 2V, 4.6 Ah nominal capacity, single cells.

Formation was performed in case with 1.18 g/cc sulfuric acid (typically 85 mL). The formation algorithm included 9 charging steps, for a total duration of 65 h and total capacity of 26.76 Ah. The electrolyte density target after formation was 1.28 g/cc.

After formation, cells were pre-conditioned by the following sequence: full charge, C20 capacity, full charge, cold crank test, full charge, C20 capacity, full charge, and cold crank test. C20 is a low current discharge of 0.05×Cn at 25° C., and cold crank is a high current discharge of 5×Cn at −18° C. Cn is the nominal capacity. The cold crank test was performed by discharging fully charged cells with 5*Cn current at −18° C. The reported cold crank data (CCA) is the time to reach 1V, in seconds. The dynamic charge acceptance is the current measured after 5 s of 2.4V charge at 25° C. and 80% state-of-charge (SOC) reached by discharging the cell with Cn current. The data is reported in A/Ah, where Ah is the cell nominal capacity. Cn is the 1 h discharge current based on cell nominal capacity.

After pre-conditioning, the electrolyte volume was readjusted with 1.28 g/cc sulfuric acid. The cells were weighed and placed in a water bath heated to 60° C. The cell voltage was readjusted to 2.4V with 0.5 A current and maintained at 2.4V for 3 weeks duration. Cell weight loss was measured weekly, and cell overcharge current was monitored during the entire test. Overcharge capacity of the cells was calculated by integrating the overcharge current over the overcharge time. Overcharge capacity data was collected over 3 weeks.

Data for single cells containing samples Oxidized A-F compared against PBX™ 51 carbon black ("CB") and a control (no carbon) is listed in Table 5.

TABLE 5

| Samples | Carbon wt. % | Sodium Lignosulfonate, wt. % | 3 wk. Water loss, g/Ah | 3 wk. overcharge capacity, Ah | DCA, A/Ah (5 s, 80% SOC) | CCA, s |
|---|---|---|---|---|---|---|
| Control | 0 | 0.2 | 1.74 | 23.1 | 0.64 | 135 |
| CB | 0.5 | 0.2 | 5.14 | 99.81 | 2.18 | 89.9 |
| CB | 0.5 | 0.4 | 3.66 | 72.10 | 2.44 | 119.2 |
| Oxidized B | 0.5 | 0.2 | 2.36 | 83.44 | 2.46 | 114.0 |
| Oxidized B | 0.5 | 0.4 | 2.61 | 59.22 | 2.22 | 130.5 |

It can be seen that the addition of carbon black to the negative electrode increases DCA compared to the cell containing no carbon black. However, the CCA decreases and the water loss increases, which is highly undesirable. In contrast, cells containing the disclosed oxidized carbon black results in increased DCA and CCA while reducing the 3 week overcharge capacity and 3 week water loss compared to the base carbon black-containing cells. These trends are illustrated in the bar plot of FIG. 6, which shows the results of DCA, CCA and 3 wk. water loss evolution of the batteries with and without carbon as a part of negative active material at constant concentration of sodium lignosulfonate of 0.2%.

As disclosed herein, improved dynamic charge acceptance and minimized water loss can be achieved by incorporating an oxidized carbon black having the disclosed particle morphologies and level of oxidation.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An oxidized carbon black having the following properties:
    a BET surface area ranging from 650 to 2100 $m^2/g$;
    an oil absorption number (OAN) ranging from 35 to 500 mL/100 g; and
    at least one of the following properties:
        (a) a volatile content of at least 5.5 wt. % relative to the total weight of the oxidized carbon black, as determined by weight loss at 950° C.;
        (b) a total oxygen content of at least 3.5 wt. % relative to the total weight of the oxidized carbon black;
        (c) a total titratable acidic group content of at least 0.5 $\mu mol/m^2$, as determined by Boehm's titration method; and
        (d) a total titratable acidic group content of at least 0.5 mmol/g, as determined by Boehm's titration method.

2. The oxidized carbon black of claim 1, wherein the oxidized carbon black has a BET surface area ranging from 650 to 1500 $m^2/g$.

3. The oxidized carbon black of claim 1, wherein the oxidized carbon black has an OAN ranging from 35 to 200 mL/100 g.

4. The oxidized carbon black of claim 1, wherein the oxidized carbon black is derived from the base carbon black, in which the base carbon black has a primary particle size ranging from 8 to 50 nm.

5. The oxidized carbon black of claim 1, wherein the oxidized carbon black has a conductivity index ranging from 10 to 75, where the conductivity index is derived from the following equation:

Conductivity Index=[BET×OAN]1/2/[1+volatile content].

6. The oxidized carbon black of claim 1, wherein the oxidized carbon black has a powder resistivity of at least 0.2 Ω-cm.

7. The oxidized carbon black of claim 1, wherein the oxidized carbon black has a pH ranging from 1.5 to 6, as determined by ASTM D1512.

8. The oxidized carbon black of claim 1, wherein the oxidized carbon black has a concentration of surface carboxylic groups ranging from 0.15 mmol/g to 1.5 mmol/g, or from 0.1 $\mu mol/m^2$ to 1.2 $\mu mol/m^2$, as determined by Boehm's titration method.

9. The oxidized carbon black of claim 1, wherein the oxidized carbon black has a surface energy ranging from 25 $mJ/m^2$ to 50 $mJ/m^2$.

10. The oxidized carbon black of claim 1, wherein the oxidized carbon black has a crystallite size (La) ranging from 16 Å to 23 Å, as determined by Raman spectroscopy.

11. An electrode comprising:
    an oxidized carbon black having a BET surface area ranging from 80 to 2100 $m^2/g$, wherein the oxidized carbon black has at least one of the following properties:
        (a) a volatile content of at least 3 wt. % relative to the total weight of the oxidized carbon black, as determined by weight loss at 950° C.;
        (b) a total oxygen content of at least 3.5 wt. % relative to the total weight of the oxidized carbon black;
        (c) a total titratable acidic group content of at least 0.5 $\mu mol/m^2$, as determined by Boehm's titration method; and
        (d) a total titratable acidic group content of at least 0.5 mmol/g, as determined by Boehm's titration method.

12. The electrode of claim 11, wherein the oxidized carbon black has an oil absorption number (OAN) ranging from 35 to 360 mL/100 g.

13. The electrode of claim 11, wherein the oxidized carbon black has a concentration of surface carboxylic groups ranging from 0.15 mmol/g to 1.5 mmol/g, or from 0.1 μmol/m² to 1.2 μmol/m², as determined by Boehm's titration method.

14. The electrode of claim 11, wherein the oxidized carbon black has a pH ranging from 1.5 to 6, as determined by ASTM D1512.

15. The electrode of claim 11, wherein the oxidized carbon black has a surface energy ranging from 25 mJ/m² to 50 mJ/m².

16. The electrode of claim 11, wherein the oxidized carbon black has a crystallite size (La) ranging from 16 Å to 23 Å, as determined by Raman spectroscopy.

17. A lead acid battery comprising the electrode of claim 11.

18. A method of making an oxidized carbon black, comprising:
   oxidizing a base carbon black, in which the base carbon black has a BET surface area ranging from 650 to 2100 m²/g and an oil absorption number (OAN) ranging from 35 to 500 mL/100 g;
   wherein the oxidized carbon black has at least one of the following properties:

(a) a volatile content of at least 5.5 wt. % relative to the total weight of the oxidized carbon black, as determined by weight loss at 950° C.;
   (b) a total oxygen content of at least 3.5 wt. % relative to the total weight of the oxidized carbon black;
   (c) a total titratable acidic group content of at least 0.5 μmol/m², as determined by Boehm's titration method; and
   (d) a total titratable acidic group content of at least 0.5 mmol/g, as determined by Boehm's titration method.

19. The method of claim 18, wherein the oxidized carbon black has a concentration of surface carboxylic groups ranging from 0.15 mmol/g to 1.5 mmol/g, or from 0.1 μmol/m² to 1.2 μmol/m², as determined by Boehm's titration method.

20. The method of claim 18, wherein the oxidized carbon black has a surface energy ranging from 25 mJ/m² to 50 mJ/m², or a crystallite size (La) ranging from 16 Å to 23 Å, as determined by Raman spectroscopy.

* * * * *